United States Patent [19]

Jannard

[11] 4,308,762
[45] Jan. 5, 1982

[54] LIGHTENED HAND GRIP

[75] Inventor: James H. Jannard, Laguna Niguel, Calif.

[73] Assignee: Oakley, Inc., Laguna Hills, Calif.

[21] Appl. No.: 140,099

[22] Filed: Apr. 14, 1980

[51] Int. Cl.³ .................................................. B62K 21/26
[52] U.S. Cl. ..................................... 74/551.9; 16/110 R
[58] Field of Search ...................... 74/551.9, 558.5, 558;
16/DIG. 12, 110 R; 280/821

[56] References Cited

U.S. PATENT DOCUMENTS

| 3,179,435 | 4/1965 | Miller | 74/551.9 X |
| 4,031,775 | 6/1977 | Petty | 74/551.9 |
| 4,091,497 | 5/1978 | Bade | 16/110 R |

FOREIGN PATENT DOCUMENTS

| 330243 | 6/1930 | United Kingdom | 74/558 |
| 630295 | 10/1949 | United Kingdom | 74/551.9 |

Primary Examiner—Andrew V. Kundrat
Attorney, Agent, or Firm—William W. Haefliger

[57] ABSTRACT

A lightened hand grip contains hand engageable openings, as in a flange and/or a grip body. In addition, a tread pattern may be provided on the grip body.

4 Claims, 7 Drawing Figures

LIGHTENED HAND GRIP

BACKGROUND OF THE INVENTION

This invention relates generally to hand grips, and more particularly to elastomeric hand grips as employed on bicycles or motorcycles, for example.

There is a continuing need for hand grips which are of light-weight, material saving design, and which function to enhance manual stability when gripped. While many forms of grips have been produced, none to my knowledge have embodied the unusual features of construction and functioning which characterize the present invention.

SUMMARY OF THE INVENTION

It is a major object of the invention to provide an improved hand grip meeting the above requirements and needs.

The functional design concept of the invention concerns the creation of a bicycle or motorcycle hand grip of optimum strength and offering comfort and hand traction, together with minimum weight and mass. Reductions in mass and weight in various areas of the grip are achieved by the use of "lightening holes" from which material is removed at areas of the grip not critical to the structural stability and overall strength of the grip. Such holes may be dead bottom holes, or through holes, i.e. piercing through the grip. The shapes and sizes of the holes may vary as well as their patterns. Material remaining about the holes forms a space saving frame such as used in bridge girders to provide optimum rigidity without unnecessary mass. As will be seen, the lightening holes may be located in a flange adjoining the main body of the grip, and/or in a palm fitting protrusion on the main body facing the rider, and/or in a finger fitting protrusion on the forward side of the main body facing away from the rider. The open framed structure formed by such holes creates increased surface edge extent to provide substantially increased traction when manually gripped by hand or glove.

These and other objects and advantages of the invention, as well as the details of an illustrative embodiment, will be more fully understood from the following description and drawings, in which:

DRAWING DESCRIPTION

DETAILED DESCRIPTION

Figure 1:
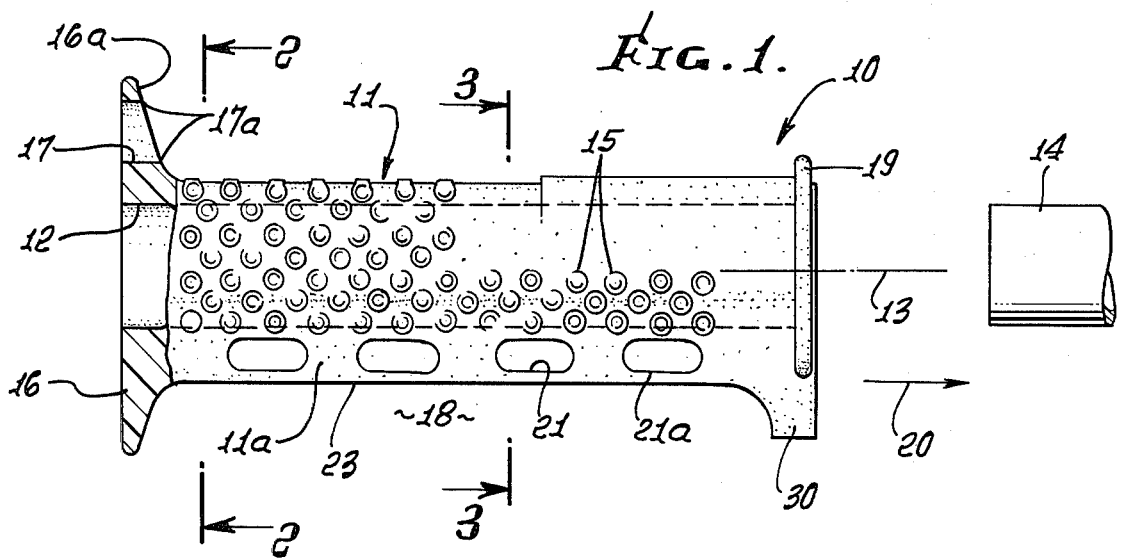
FIG. 1 is a side elevation of a hand grip incorporating the invention.
Figure 2:
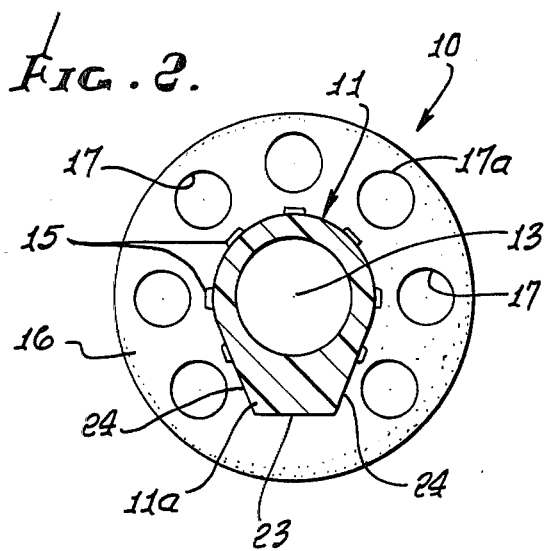
FIG. 2 is an enlarged section taken on lines 2—2 of FIG. 1.
Figure 3:
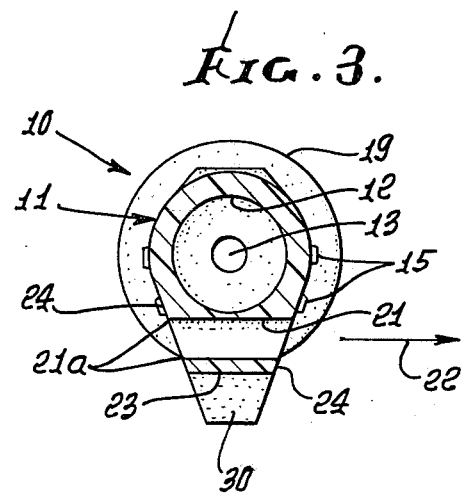
FIG. 3 is an enlarged section taken on lines 3—3 of FIG. 1.

In FIGS. 1-3 the elastomeric hand grip 10 includes an elongated body 11 having a cylindrical bore 12 defining an elongated axis 13. The bore is sized to receive a bicycle or motorcycle handle (indicated for example at 14) when the grip is applied to the handle. Handles of other objects may also receive or fit the grip. The grip exterior is shown as incorporating a large number or small annular protrusions 15 which are closely spaced apart and define a tread to aid in manual grasping of the grip.

At one end of the grip in an annular flange 16 which is integral with the body 11. The flange contains a series of openings 17 spaced apart about axis 13, these openings extending in the direction of axis 13 and facing the annular region 18 about the body. Typically, those openings extend completely through the flange; however, they may extend into the flange from its side 16a and to a depth less than the flange thickness. Further, the openings may typically be circular and have diameters between about $\frac{1}{4}$ and $\frac{1}{2}$ inch. Such openings contribute to lightening the weight of the grip, with consequent savings of elastomeric material, as for example oil based rubber. Also, their edges 17a which face region 18 are adapted to be engaged by the hand or glove of the cyclist, to resist relative rotation of the hand and grip, about axis 13, thereby to stabilize the hand on the grip. A smaller flange 19 is integral with the opposite end of the body, and blocks hand retraction in the direction indicated by arrow 20.

The body 11 also contains a series of openings 21 spaced apart lengthwise of the body, such openings extending transversely of the longitudinally extending axis 13, and also being offset from that axis as well as from bore 12. In the example, openings 21 are longitudinally elongated as shown, and they extend through the body below bore 12, in transverse directions indicated by arrow 22 in FIG. 3. Openings 21 are also located in the downwardly protruding portion 11a of the body, the bottom side of which may be flattened as at 23. The openings 21 extend between downwardly convergent, opposite sides 24 of the body. As a result, those openings also contribute to the lightening of the grip, and saving of elastomeric material. Further, their outwardly presented edges 21a are adapted to be engaged by the hand or glove of the cyclist, to resist relative rotation of the hand and grip about axis 13, adding to stability. To this end, the openings 21 may be spaced along the body at approximately the finger positions, i.e. at least four spaced apart locations, as shown. Note also the downward protrusion 30 at the end of the body, beneath the level of flange 19, to confine the user's fingers between flange 16 and protrusion 30.

Figure 4:
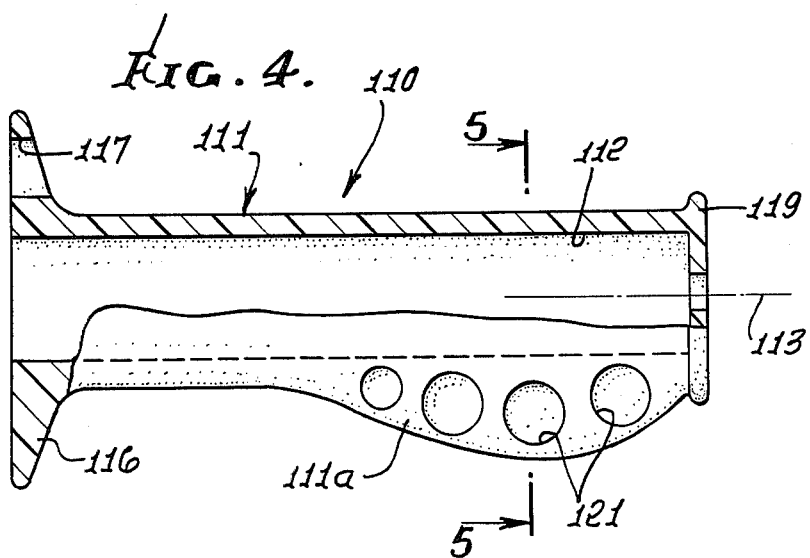
FIG. 4 is a side elevation of a modified form of hand grip.
Figure 5:
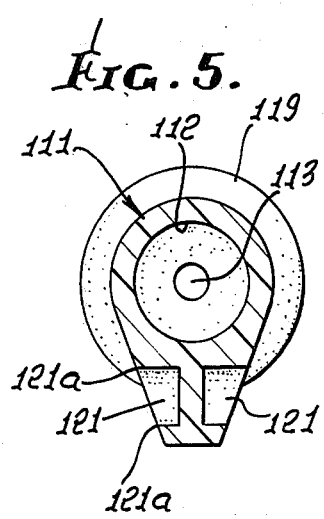
FIG. 5 is an enlarged section taken on lines 5—5 of FIG. 4.

In FIG. 4 the modified grip 110 includes a body 111, end flange 116 corresponding to flange 16 (i.e. having openings 117 like openings 17), and end flange 119, like flange 19, is integral with the opposite end of the body. A downward protrusion 111a from the $\frac{2}{3}$ of the body closest to flange 119 is downwardly convex, as shown. That protrusion contains a series of transverse openings 121 which are circular in cross section, and offset from bore 112 and axis 113. Further, and as shown in FIG. 5, those openings 121 need not pass completely through the protrusion, but only part way through same. They also present outward edges 121a functioning as to edges 21a in FIG. 3.

Protrusions 11a and 111a facilitate hand gripping of the bodies 11 and 111.

Figure 6:
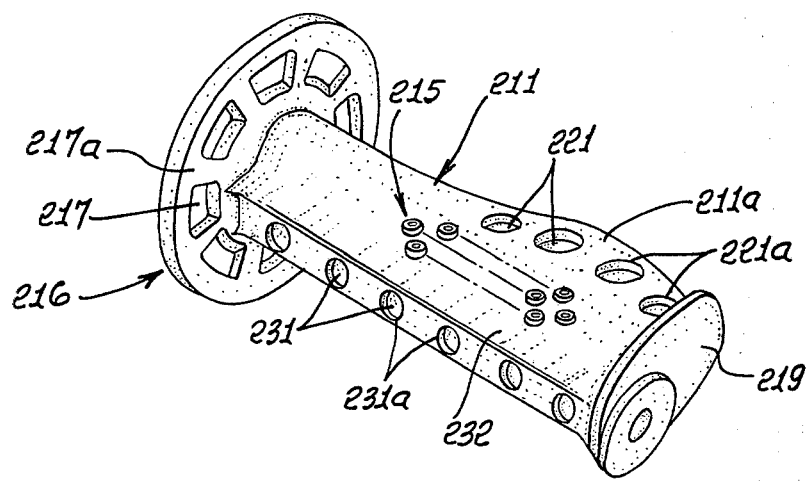
FIG. 6 is a perspective view of another modified form of grip.

The hand grip of FIG. 6 is like that of FIG. 4, and includes a body 211, and end flange 216 corresponding to flange 16, i.e. having circularly spaced openings 217 which correspond to openings 17 but are not circular; rather, they are shaped to define spokes 217a between the openings. An end flange 219, like flange 19, is integral with the opposite end of the body.

A lateral protrusion 211a from the § of the body closest to flange 219 is laterally convex, as shown. That protrusion contains a series of transverse openings 221 which are offset from the elongated handle receiving bore in the body, and extend transversely relative thereto. Such openings may extend through, or part way through, the protrusion, and they have outward edges 221a, functioning as do edges 21a in FIG. 3.

In addition, the body contains another series of openings 231 spaced lengthwise of the body along a protrusion or rib 232 which extends between flanges 216 and 219. Openings 231 are typically dead bottom recesses, and they extend inwardly toward the bore or axis defined by the body (see bore 112 in FIG. 4). They also have edges 231a functioning as do edges 21a in FIG. 3.

Small annular protrusions 215 may be located on and over the main extent of the body 211, as do protrusions 15 in FIG. 1, to provide a gripable tread.

Figure 7:
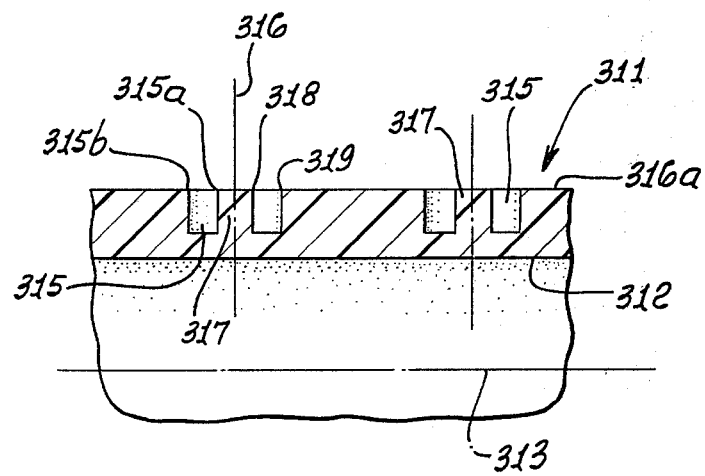
FIG. 7 is an enlarged section showing a further improved tread construction.

Referring to FIG. 7, it shows in enlarged section a modified hand grip body 311 (corresponding to body 11 in FIG. 1). The body contains a bore 312 and has an axis 313. A series of relatively small openings is sunk in the body and distributed over the body to form a recessed tread, in the same manner that protrusions 15 are distributed in FIG. 1. For example, note annular openings 315 having inner and outer annular walls 315a and 315b extending about an axis 316. A central stem 317 is outstanding at the center of each ring shaped opening. Annular edges 318 and 319 are formed at the intersection of the walls 315a and 315b with body surface 316a, and such edges engage the users hand or glove for increased stability.

I claim:
1. In an elastomeric hand grip, the improvement comprising
   (a) an elongated grip body having a bore defining an axis, the body adapted to be hand gripped, and
   (b) a series of relatively small openings sunk in the body from its outersurface and toward the body interior, said openings distributed over the body to form a recessed tread,
   (c) said openings being ring shaped, there being stems about which the ring shaped openings extend.
2. The invention of claim 1 wherein the body contains another series of openings spaced apart lengthwise of the body, said other openings communicating with the body exterior to be manually engaged, said other openings extending generally transversely of said axis and offset from said bore.
3. The invention of claim 1 wherein the body includes an integral flange at one end thereof, the flange containing a series of openings spaced about said axis, said flange openings facing the region about the body.
4. The invention of claim 3 wherein the body contains another series of openings spaced apart lengthwise of the body, said other openings communicating with the body exterior to be manually engaged, said other openings extending generally transversely of said axis and offset from said bore.

* * * * *